UNITED STATES PATENT OFFICE.

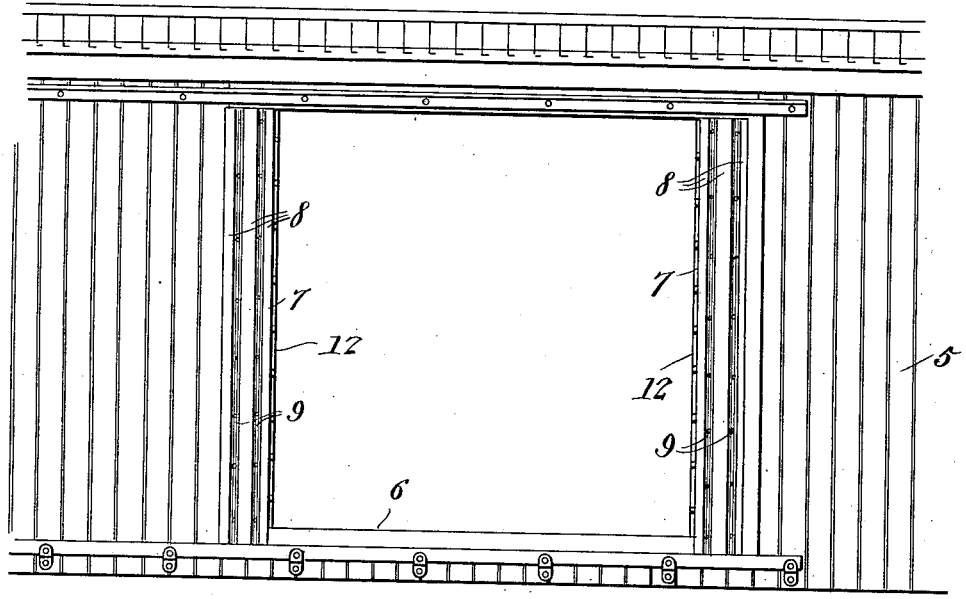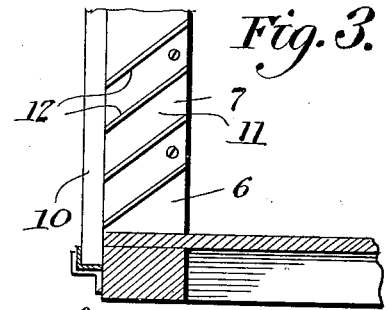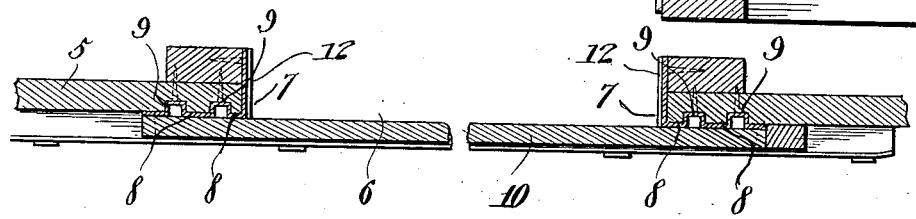

RICHARD THALHEIM, OF GRETNA, LOUISIANA.

CAR-DOOR.

1,096,139.  Specification of Letters Patent.  Patented May 12, 1914.

Application filed October 7, 1913. Serial No. 793,915.

*To all whom it may concern:*

Be it known that I, RICHARD THALHEIM, a citizen of the United States, residing at Gretna, in the parish of Jefferson and State of Louisiana, have invented new and useful Improvements in Car-Doors, of which the following is a specification.

The invention relates to car doors, and has for its primary object to provide a car door wherein rain, sleet, snow or the like will be excluded from the interior of the car through the doorway.

Another object of the invention is the provision of a car door wherein the door frame is constructed in a novel manner so that any ordinary well-known form of door can be employed and the same will be weatherproof.

A further object of the invention is the provision of a car door which is extremely simple in construction, reliable and efficient in its purpose, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing: Figure 1 is a fragmentary side elevation of a car showing the door open, the doorway being constructed in accordance with the invention. Fig. 2 is a horizontal transverse sectional view through the car, showing the door in closed position. Fig. 3 is a fragmentary vertical transverse sectional view through the car.

Similar reference characters indicate corresponding parts throughout the several views in the drawing.

Referring to the drawing by numerals, 5 designates a portion of the side wall of a car having the usual doorway 6 therein. Mounted at opposite sides of the doorway 6 on the outer and inner surfaces thereof are angle plates 7, preferably constructed from metal, each being formed with spaced parallel vertically arranged inner and outer grooves 8 and 9 respectively, the same being coextensive with the length of the plate and form drainage channels between the door 10 and the doorway, the said door being slidably mounted exteriorly of the side wall of the car as usual. Each plate 7 has formed on its inturned portion 11 spaced diagonally disposed ribs 12 which incline outwardly and serve to deflect the rain, snow or the like toward the bottom of the doorway should the same leak through the space between the door and the doorway beyond the grooves 8 and 9 therein. The grooves serve to prevent rain from working its way interiorly of the car and afford drainage channels to direct the rain toward the bottom of the door, whence it will be discharged onto the track bed or ground. By reason of this construction of doorway it will be impossible for the rain, snow or the like to enter the car therethrough when the door is closed.

From the foregoing it is thought that the construction and manner of operation of the device will be clearly understood, and therefore a more extended explanation has been omitted.

What is claimed is:—

The combination with a car having a doorway, of angle plates fixed at opposite sides of the doorway, each plate having in its outermost flange portion spaced longitudinally disposed parallel grooves, and ribs formed on the remaining flanges of the plates and disposed diagonally on an incline toward the exterior of the car.

In testimony whereof I affix my signature in presence of two witnesses.

RICHARD THALHEIM.

Witnesses:
 ANDREW H. THALHEIM,
 LOUISE THALHEIM.

Copies of this patent may be obtained for five cents each, by addressing the "Commissioner of Patents, Washington, D. C."